April 27, 1965   J. R. FITZPATRICK   3,180,589
LIGHTER-THAN-AIR CRAFT
Filed Oct. 4, 1962   5 Sheets-Sheet 1

JOHN R. FITZPATRICK
INVENTOR.

BY *Albert Sperry*

ATTORNEY

April 27, 1965   J. R. FITZPATRICK   3,180,589
LIGHTER-THAN-AIR CRAFT
Filed Oct. 4, 1962   5 Sheets-Sheet 2

JOHN R. FITZPATRICK
INVENTOR.

BY Albert Sperry

ATTORNEY

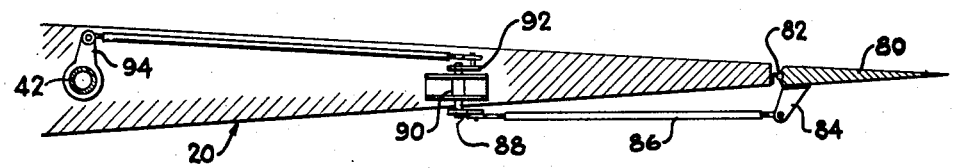
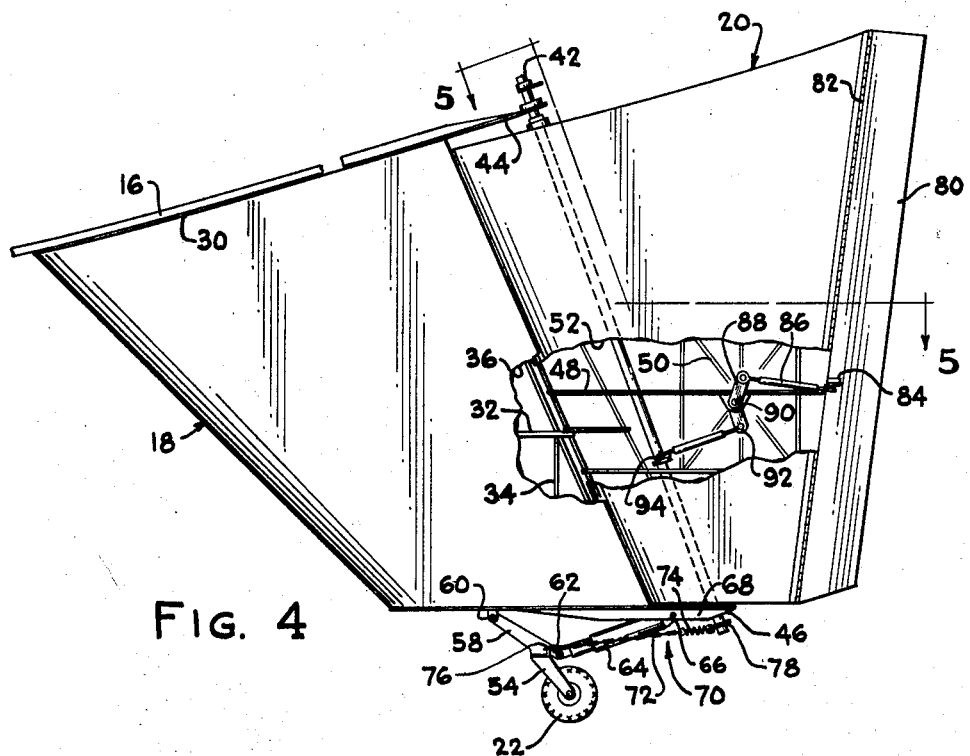
JOHN R. FITZPATRICK
INVENTOR.
BY *Albert Sperry*
ATTORNEY

April 27, 1965  J. R. FITZPATRICK  3,180,589
LIGHTER-THAN-AIR CRAFT
Filed Oct. 4, 1962  5 Sheets-Sheet 4

JOHN R. FITZPATRICK
INVENTOR.

BY *Albert Sperry*
ATTORNEY

April 27, 1965     J. R. FITZPATRICK     3,180,589
LIGHTER-THAN-AIR CRAFT

Filed Oct. 4, 1962     5 Sheets-Sheet 5

JOHN R. FITZPATRICK
INVENTOR.

BY *Albert Sperry*

ATTORNEY

United States Patent Office 3,180,589
Patented Apr. 27, 1965

3,180,589
LIGHTER-THAN-AIR CRAFT
John R. Fitzpatrick, Levittown, Pa., assignor to Aereon Corporation, King of Prussia, Pa., a corporation of Pennsylvania
Filed Oct. 4, 1962, Ser. No. 228,286
4 Claims. (Cl. 244—30)

This invention relates to lighter-than-air craft which are of greater width than height and is directed particularly to airships possessing improved ground handling characteristics.

Lighter-than-air craft of either the rigid or non-rigid type present serious difficulties in their control near the ground as when taking off or landing or when being moved into and out of a hangar. Thus, large and experienced ground crews or complex mechanical equipments are required; and when cross winds or transverse air currents are encountered, the airship may "kite" or become almost unmanageable in moving the ship from one position to another or when moving it into or out of a hangar. The ships are sometimes moored to masts, but such masts are expensive to construct and are not available at all airports so that airships cannot safely land in locations where mooring masts are not available.

In accordance with the present invention, these and other objections and limitations of airships are overcome or reduced and novel constructions are provided which are capable of handling and control close to the ground without the need for the usual large and experienced ground crews. The constructions are instead capable of taking off and landing with a minimum of assistance and may land and remain at airports or in other areas where no hangar or mooring mast is available.

Accordingly, the principal objects of the present invention are to simplify the control of lighter-than-air craft adjacent or on the ground, to limit the personnel required when lighter-than-air craft take off and land, and to facilitate the mooring of lighter-than-air craft and the control thereof on the ground.

These and other objects and features of the present invention will appear from the following description thereof wherein reference is made to the figures of the accompanying drawings.

In the drawings:

FIG. 4 is an enlarged view of one of the rear stabilizing fin and rudder assemblies;

FIG. 5 is a horizontal sectional view of the assembly shown in FIG. 4 taken on the line 5—5 thereof;

Figure 1:
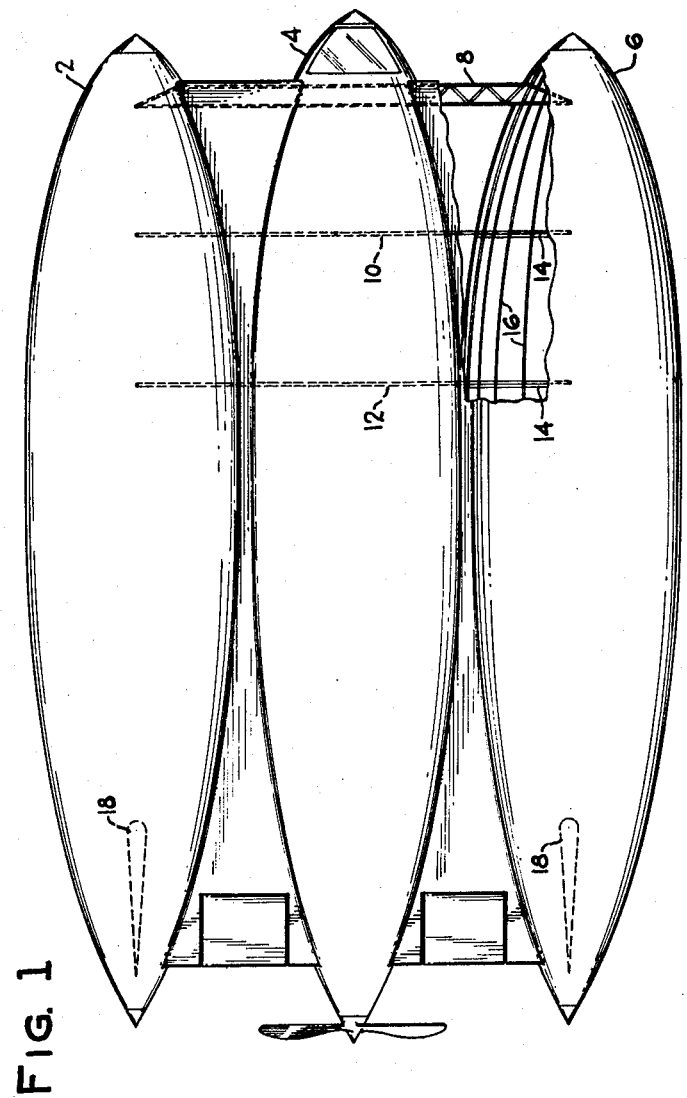
FIG. 1 is a plan view of a typical form of lighter-than-air craft embodying the present invention.

In that form of the present invention chosen for purposes of illustration in the figures of the drawings, the airship is of the multiple hull type shown and described in co-pending application Serial No. 206,384. Such an airship may have three elongated hulls as indicated at 2, 4 and 6 which are secured together by cross beams 8, 10 and 12, for example, so that the longitudinal axes of the various hulls are arranged with their axes parallel. Each hull is provided with a framework including ring assemblies 14 and longerons 16 which may be of any preferred type and construction but preferably are of the type shown and described in co-pending application Serial No. 170,068.

The two outer hulls 2 and 6 of the airship each have a stabilizer fin 18 and a rudder 20 assembled together and located near the rear of the ship and extending downward from the hulls thereof. Landing wheels 22 are located at the lower extremities of the fin and rudder assemblies whereas a forward landing gear assembly 24 with one or more landing wheels 26 is mounted on the central hull 4 of the airship and is positioned near the front of the ship. The front landing wheels 26 are thus positioned near the center of the front of the ship while the rear landing wheels 22 are located in widely spaced relation near the rear of the ship to provide a tricycle type of support and landing means for the aircraft.

The assembly described above serves to provide a large base with three widely spaced points of support for affording a stable mounting for the airship on the ground. The stabilizer fins 18 on the outer hulls 2 and 6 of the airship extend downwardly below the longitudinal axes 28 of the hulls. The stabilizer fins each include an upper mounting plate 30 which may be secured at its opposite edges to adjacent longerons 14 located near the rear of the framework of the hulls 2 and 6. Other horizontally positioned plates 32 may be arranged in parallel spaced relation within the stabilizing fins 18 and inclined bracing and supporting members in the form of rods, tubes or elements 34 are secured to the horizontal plates 32 and mounting plate 30 and may be suitably secured at their upper ends to the ring assemblies 12 or other framework elements secured to the hull upon which the fin is mounted. The outer sides of the stabilizing fins 18 are provided with a covering 36 of light sheet metal, fabric or other suitable material.

The fins 18 extend downwardly from the hulls 2 and 6 in substantially vertical alignment with the longitudinal axes 28 of the hulls. The fins 18 are thus located below the axis of buoyancy 38 of the hulls 2 and 6 and are largely or entirely positioned below the center of gravity 40 of the ship although the location of the center of gravity will, of course, depend upon the loading of the ship. The strong reinforced construction of the stabilizing fins 18 as thus formed renders it possible to mount the rear landing wheels 22 on the stabilizing fins. This positioning of the stabilizing fins 18 entirely or largely below the longitudinal axes 28 of the hulls and below the axis of buoyancy 38 largely eliminates the tendency for the airship to roll about a longitudinal axis when subjected to the forces exerted by side winds or transverse air currents when the ship is on or near the ground. Moreover, when the airship lands and the landing wheels 22 and 26 are in engagement with the ground, there can be no rolling of the airship about the longitudinal axis whatever, since the tricycle arrangement of the landing wheels provide three extended and spaced points of support.

The rudders 20 of the airship are mounted at the rear of each of the stationary stabilizing fins 18. The rudders are pivotally movable about a torque tube 42 which has its upper end rotatably mounted in a plate 44 extending rearwardly from the upper mounting plate 30 of the stabilizer fin 18. The lower end of the torque tube 42 is rotatably mounted in a sole plate 46 extending rearwardly from the lowermost horizontal plate 32 of the stabilizing fin. The rudders 20 embody horizontal plates 48 and diagonal bracing members 50 or are otherwise constructed to afford the desired strength for the rudder. The outer surface of the rudder, like the fin 18, is provided with a sheet metal or other covering 52.

The rear landing wheels 22 of the airship are carried by a wheel yoke 54 horizontally rotatable about a vertical axle mounted on the wheel strut 58 as shown in FIG. 4. The strut 58 is pivotally mounted at 60 near the front end of the sole plate 46 of the stabilizing fin. The rearward end of the strut 58 on which the wheel yoke 54 is pivotally movable is connected by a drag link 62 to a shock absorbing cylinder 64 pivotally connected at 66 to a bracket 68 on sole plate 46. Steering connections 70 such as the link chains 72 and springs 74 are releasably secured at their opposite ends to the opposite ends of the arms 76 on wheel yoke 54 and to arms 78 secured to the lower end of the torque tube 42.

With this construction, the rear landing wheels 22 on the stabilizing fins 18 are yieldably mounted to afford a cushioned landing of the rear of the ship and at the same time render the ship steerable both in the air and on the ground by rotation of the torque tube 42. However, it will be noted that the connections 70 including the chains 72 need only be maintained during flight or when the airship is taking off or landing. When the ship is to be moored or to be moved about on the ground, the chains 72 may be disconnected from the arms 76 of the wheel yoke 54 to permit free rotation or castering of the wheels 22. The airship may then move pivotally about a stationary point such as the front landing wheel 26 and the landing gear assembly 24 or may be otherwise moved independently of the rudder operation.

The rudders 20 are movable about the torque tube 42 to steer the airship by operation of a steering tab 80 extending vertically along the rear edge of the rudder. For this purpose, the steering tab is pivotally connected to the rear edge of the rudder by means of a piano hinge 82. An arm 84 is secured to the tab 80 and is actuated to move the tab relative to the rudder 20 by means of a link 86 having one end connected to arm 84 and the other end connected to an actuating crank 88 on a short horizontal shaft 90 on the rudder. The shaft 90 and crank 88 are in turn actuated by a crank arm 92 connected to shaft 90 and to an operating rod movable by the torque tube 42 through the torque tube arm 94.

The rear tab 80 of the rudder thus serves as a steering tab which is movable by operation of the torque tube 42 to project laterally to one side or the other of the rudder 20. During flight the rudder will be moved by the force of rearwardly flowing air impinging on tab 80 to shift the rudder from one side to the other. On the other hand, when the ship is on the ground, the rudder tab 80 and thus rudder 20 will be movable with the rear landing wheels 22 through the action of the wheel yoke 54 and connections 70 secured to the arms 76 on the torque tube 42.

Figure 6:
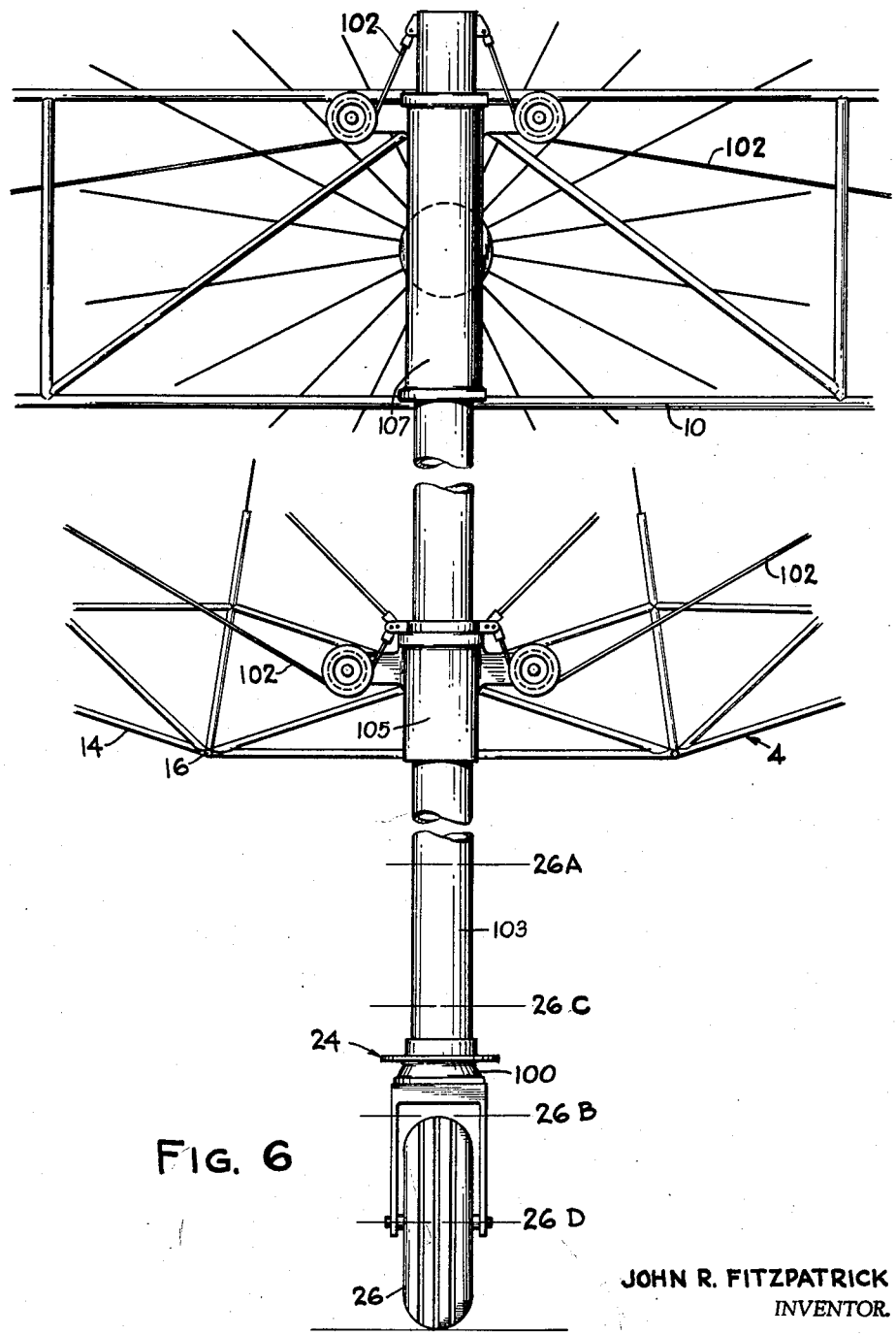
FIG. 6 is a vertical sectional view of the airship of FIG. 1 with a typical nose wheel and mounting therefor shown in elevation.
Figure 7:
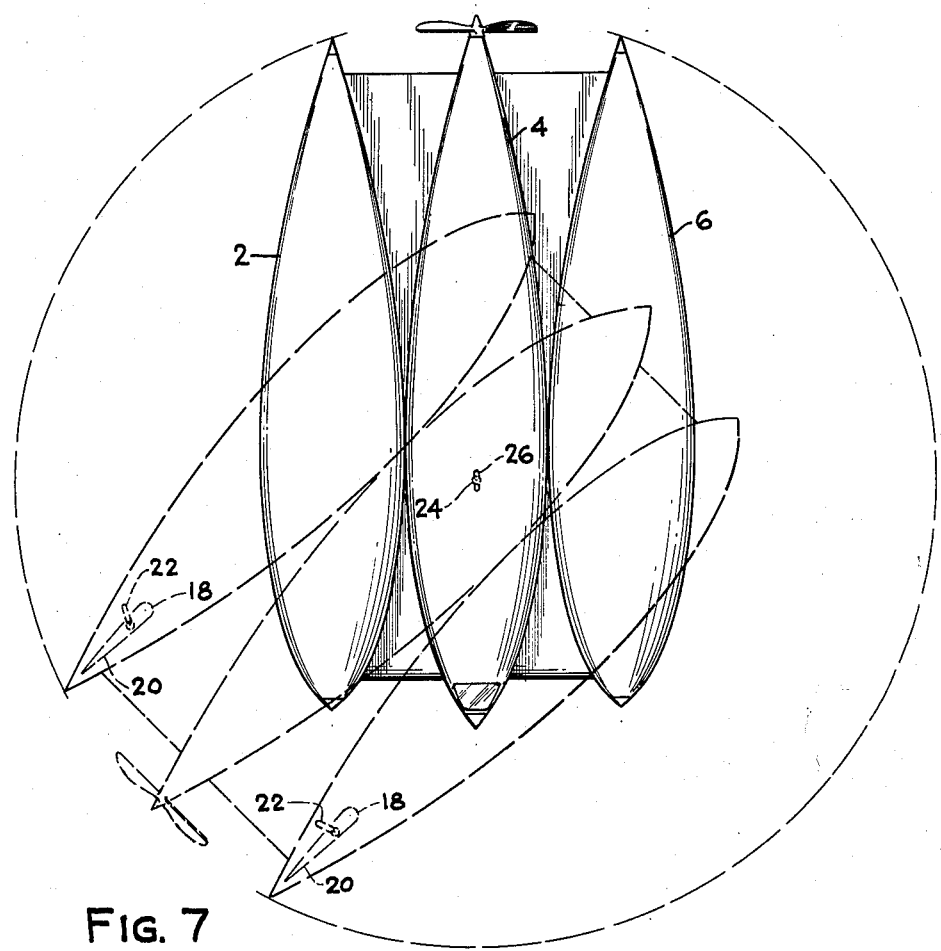
FIG. 7 is a plan view of an airship embodying the present invention as moored on an airfield.

The nose wheel 26 located near the front of the ship is carried by a yoke 27 and positioned below and in a vertical plane with the central axis 28 of the ship. As shown in FIG. 6, the nose wheel 26 is mounted on a landing gear assembly 24 which may include suitable shock absorbing means (not shown). The upper end of the landing wheel assembly 24 is provided with a rotatable joint 100 or other connection which will permit free rotation or swinging movement of the airship through an arc of 360 degrees about the landing gear assembly as an axis when the ship is moored on the ground. At such times, the connections 70 which establish a steering relation between the torque tube 42 and the rear landing wheels 22 are disconnected to permit the landing wheels 22 to rotate freely or to caster about the vertical pins 56 on wheel struts 58. The rear end of the airship with its rudders 20 and rear landing wheels 22 may then caster to allow the ship to swing freely in a circle about the front landing wheel 26 in response to the force of any laterally directed winds upon the stabilizing fins 18. Therefore, as shown in FIG. 7, when the ship is on the ground, it may be permitted to "weather vane" about the stationary nose wheel 26 and the landing gear assembly 24 as a pivot keeping the nose of the airship facing toward the wind. However, if desired, the connections 70 may be allowed to remain so as to prevent castering or uncontrolled movement of the rear landing wheels 22. In fact, the cooperation afforded by rear landing wheels 22 resting on the ground and the downwardly projecting stabilizing fins 18 and rudder 20 which are located below the axis of buoyancy 38 and adjacent or below the center of gravity 40 serves to increase the stability of the airship on the ground.

Further, in accordance with the present invention, the landing gear assembly 24 is adjustable to raise or lower the nose of the airship when it is on the ground. For this purpose, the landing gear assembly 24 may include a vertically movable mooring mast 103 slidable vertically within sleeve 105 secured to one of the forward ring assemblies 4 and a sleeve 107 carried by one of the forward cross beams such as the cross beam 10. Cables or other means 102 are operably connected to the mooring mast 103 by suitable means to raise and lower the mast and the nose of the ship. With this construction, the nose of the ship when moored may be lowered by drawing the mooring mast upward as shown in dotted lines at X in FIG. 3 so that the airship will tilt downward at the front. The rear landing wheels may then be released to caster freely in wind and about landing wheel 26 as a center. The nose of the ship then will always be headed into the wind by the free swinging of the tail of the ship about the landing gear 24 as a pivot. Moreover, since the nose is lowered and the upper surface of the airship is inclined toward the nose, the upper surface will be exposed to the wind to a greater extent than the lower surface and the hull will act as an airfoil. As a result, the wind will tend to force the hull of the airship downward, or toward the ground, by its pressure on the exposed upper surface of the ship. Accordingly, the airship may be said to "squat" under the force of the wind which will always be flowing in a direction from the nose toward the tail of the ship.

Figure 3:
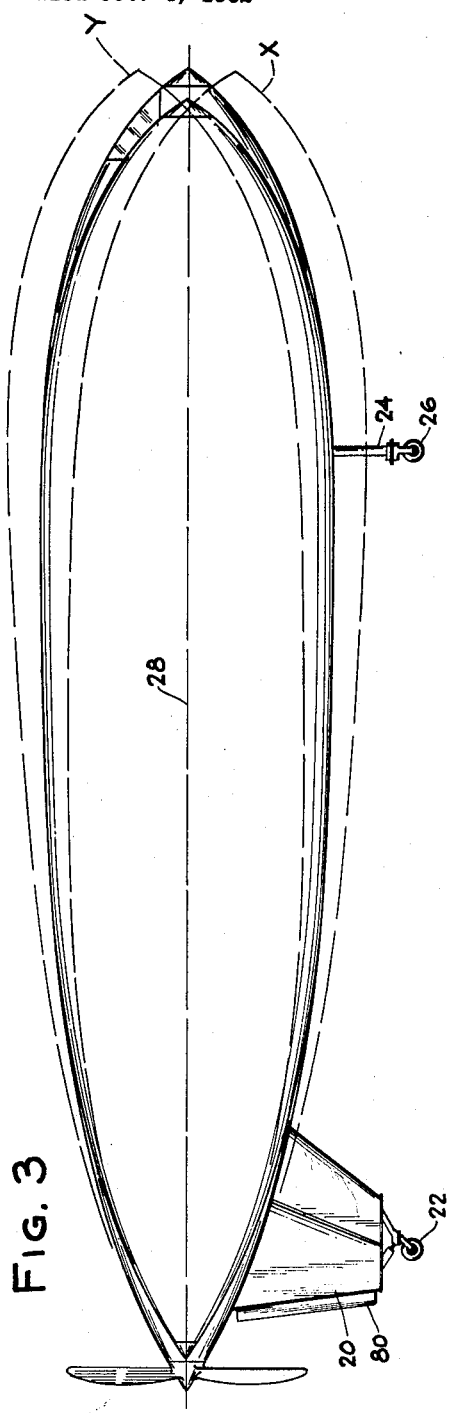
FIG. 3 is a side view of the airship illustrated in FIG. 1.
Figure 2:
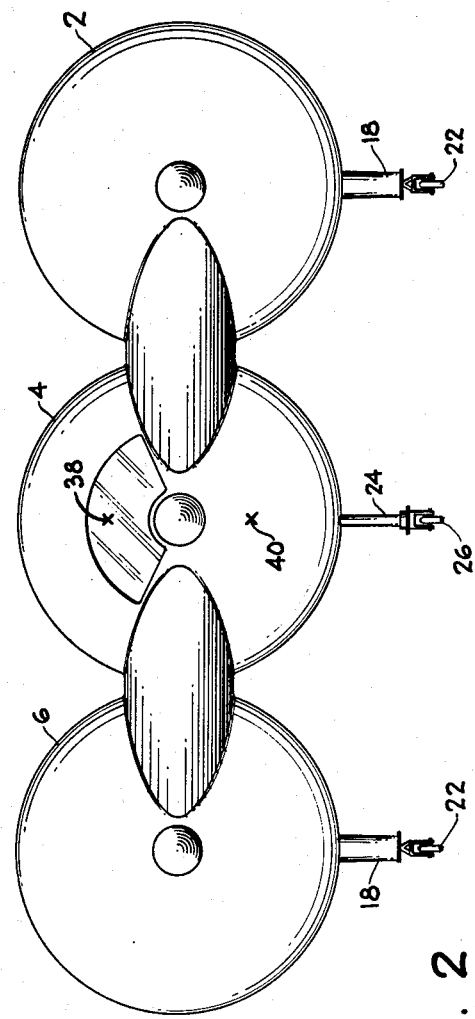
FIG. 2 is a front view of the airship shown in FIG. 1.

On the other hand, when the ship is to take off, the adjustable means 102 of the landing gear assembly 24 may be actuated to lower or extend the mooring mast 103 downward to raise the nose of the airship as shown in dotted lines at Y in FIG. 3. The multiple hull or other formation of the envelope which is characterized by greater width than height then provides increased aerodynamic lift as the airship moves over the ground. Rapid take-off and climbing of the airship and heavier loading of the ship is possible since both the buoyant and flying wing effects of such lighter-than-air craft may be utilized to maximum advantage. In typical practice in accordance with the present invention, the mooring mast 103 and landing wheel 26 may be fully retracted during flight so that its axle will be located in the position indicated by the line 26A in FIG. 6. When a landing is to be made, the mooring mast may be extended sufficiently to cause the wheel 26 to be located in the position indicated by the line 26B. Upon mooring the airship, the mooring mast and landing wheel may again be raised to either the fully retracted position of line 26A or to an intermediate position 26C to lower the nose of the airship. On the other hand, upon take-off of the airship, the mooring mast 103 and landing wheel 26 may be lowered or projected to the position 26D whereby in the nose of the airship is raised.

Of course, the airship may take off and land vertically if desired when the ship is sufficiently buoyant or not overloaded so that it is not actually necessary to employ a runway. As a result, the airship may land and be moored easily in substantially any location without the need for conventional and expensive mooring masts or other large and permanent structures such as hangars and the like. Furthermore, the ground crews heretofore required for moving and controlling the action of airships near the ground are largely dispensed with.

While the lighter-than-air craft particularly described and shown in the drawings is referred to as being of the rigid type and embodying a plurality of hulls, such constructions are not necessary in order to attain many or all of the advantages of the present invention. Thus, the airship may be of the non-rigid type; and it may have a single hull or envelope. Furthermore, although the airship is preferably of greater width than height, numerous features of the present invention may be utilized in other or conventional types of airships. Moreover, the landing gear or wheels employed in the aircraft may be retractable and the stabilizing fins, rudder and other elements of such assembly may be formed and constructed in various ways and need not be located entirely below the axis of buoyancy of the airship.

These and other changes and modifications may be made in the combinations and arrangements of the elements and the shape and construction thereof. In view thereof, it should be understood that the particular embodiment of the invention shown in the drawings and described above is intended to be illustrative only and is not intended to limit the scope of the inventioin.

I claim:

1. Lighter-than-air craft comprising an envelope of greater width than height having buoyant gas contained therein, said craft having tricycle landing means including a mooring mast carried by the aircraft and provided with a ground engaging nose wheel located substantially on the center line of said craft below the envelope and near the nose thereof, transversely spaced rear landing wheels located below said envelope near the rear of said craft, said rear landing wheels being mounted for castering movement on the ground, a horizontally rotatable connection between the nose wheel and aircraft cooperating with said castering rear wheels to permit the aircraft to be rotated about said nose wheel as a pivot when the aircraft is moored on the ground and said nose wheel is held at a stationary point, and means connected to the mooring mast for raising and lowering the nose of the aircraft to facilitate take off and landing of the aircraft and to enable the aircraft to be moored with the nose of the aircraft continually lowered into the wind as it rotates about said stationary point on the ground.

2. Lighter-than-air craft having a landing gear carried thereby and provided with means engageable with the ground, said landing gear and ground engaging means being located near the forward portion of the aircraft, casterable landing wheels carried by said aircraft and located near the rear portion of the aircraft, a horizontally rotatable connection between the landing gear and aircraft cooperating with the casterable landing wheels to render the airship movable on the ground about the landing gear as a pivot when the ground engaging means on the landing gear is at a stationary point on the ground, said landing gear being vertically movable relative to the aircraft to raise and lower the forward portion of the aircraft.

3. Lighter-than-air craft embodying a central elongated hull and two outer elongated hulls being located adjacent and on opposite sides of said central hull, said hulls having their longitudinal axis extending substantially parallel to each other, a mooring mast carried by said aircraft and positioned near the forward portion thereof in substantially vertical alignment with the longitudinal axis of the central hull, casterable ground wheels carried by the aircraft and located near the rear thereof on opposite sides of the longitudinal axis of the central hull, a horizontally rotatable connection between the mooring mast and aircraft rendering said aircraft pivotally movable on the ground about said mooring mast, said mooring mast being vertically movable relative to said aircraft to raise and lower the forward portion thereof.

4. Lighter-than-air craft comprising a plurality of hulls each of which has a substantially rigid framework, including longitudinally spaced ring assemblies, said hulls being arranged symmetrically with respect to a central longitudinal axis of the aircraft, a mooring mast having ground engaging means thereon, the mooring mast and ground engaging means being supported by a ring assembly of the framework and located in vertical alignment with said longitudinal axis near the front of the aircraft, ground engaging wheels carried by said aircraft and located at spaced points on opposite sides of said longitudinal axis near the rear of the aircraft, said ground engaging wheels being mounted for castering movement, a horizontally rotatable connection between the ground engaging means on the mooring mast and the aircraft permitting the aircraft, when on the ground, to move about the mooring mast as a pivot, and means for moving said mooring mast vertically to vary the angle of inclination of the longitudinal axis of the aircraft.

References Cited by the Examiner
UNITED STATES PATENTS

| 1,024,766 | 4/12 | Cassell | 244—109 X |
| 1,343,428 | 5/20 | Berry | 244—30 |
| 1,477,338 | 12/23 | Finley | 244—30 |
| 1,574,567 | 2/26 | Flettner | 244—82 |
| 2,294,850 | 9/42 | Ostrander | 244—109 |
| 2,481,379 | 9/49 | Zimmerman | 244—7.2 |
| 2,606,726 | 8/52 | Henion | 244—103 |
| 2,626,116 | 1/53 | Steuby | 244—103 |
| 2,745,612 | 5/56 | Cupp | 244—109 X |
| 2,778,585 | 1/57 | Tschudy | 244—30 |
| 2,943,820 | 7/60 | Westcott | 244—103 |

FERGUS S. MIDDLETON, *Primary Examiner.*